United States Patent [19]
Luecke

[11] Patent Number: 5,806,292
[45] Date of Patent: Sep. 15, 1998

[54] CROP GATHERING APPARATUS WITH FOLDABLE ROW DIVIDER MEMBERS AND ROTATABLE CONVEYOR PANELS

[76] Inventor: William J. Luecke, 765 E. 41st St., Hays, Kans. 67601

[21] Appl. No.: 788,503

[22] Filed: Jan. 29, 1997

[51] Int. Cl.$^6$ ............................. A01D 45/02; A01D 63/04
[52] U.S. Cl. .................................. 56/119; 56/14.5; 56/94
[58] Field of Search ........................... 56/119, 14.7, 14.3, 56/14.5, 14.6, 16.4 R, 16.6, 71, 94, 95, 99, 109, 110, 126, 219

[56] References Cited

U.S. PATENT DOCUMENTS

| | | | |
|---|---|---|---|
| 2,929,185 | 3/1960 | McEachern | 56/219 |
| 3,119,221 | 1/1964 | Martin | 56/119 |
| 3,736,734 | 6/1973 | Pavel | 56/94 X |
| 3,771,300 | 11/1973 | Jourdan | 56/119 |
| 3,919,830 | 11/1975 | Gerber | 56/13.6 |
| 4,429,516 | 2/1984 | Erickson | 56/95 |
| 4,567,717 | 2/1986 | Manton | 56/119 |
| 4,584,825 | 4/1986 | Atkinson | 56/219 |
| 4,704,850 | 11/1987 | Obermeier | 56/119 |
| 4,926,623 | 5/1990 | Fiener | 56/60 |
| 4,965,991 | 10/1990 | Sauder | 56/119 |
| 5,040,362 | 8/1991 | Morgan et al. | 59/93 |
| 5,444,968 | 8/1995 | Barton | 56/119 |

Primary Examiner—Terry Lee Melius
Attorney, Agent, or Firm—Flanagan & Flanagan; John K. Flanagan; John R. Flanagan

[57] ABSTRACT

A crop gathering apparatus includes a rear platform attachable across a front end of a harvesting machine header, row divider members laterally-spaced and mounted to and projecting forwardly from the rear platform for guiding crop material rearwardly toward the header, and rotatably-driven vertical rotary members laterally-spaced and mounted on the rear platform for conveying crop material across the rear platform to the header. Each row divider member has a forwardly-tapered front crop-engaging structure with rearward and forward sections. Each rearward section is hinged about a transverse axis to the rear platform to allow pivotal adjustment of the angle of the front crop-engaging structure relative to the rear platform. The forward section is hinged about a transverse axis to the rearward section and pivotally movable between extended and folded conditions. Each rotary member has a central rotary shaft extending between and rotatably mounted to the rear platform and an upper transverse support member, and panels circumferentially-spaced about and attached to the shaft and extending outwardly therefrom to engage and convey crop material rearwardly across the rear platform to the header. Support elements are connected between the upper transverse support member and row divider members for retaining the row divider members in a desired angular position relative to the header.

19 Claims, 3 Drawing Sheets

CROP GATHERING APPARATUS WITH FOLDABLE ROW DIVIDER MEMBERS AND ROTATABLE CONVEYOR PANELS

BACKGROUND OF THE INVENTION

1. Field of the Invention

The present invention generally relates to devices for gathering crops and, more particularly, is concerned with a crop gathering apparatus with foldable row divider members and rotatable conveyor panels which is attachable to a front end of a combine or the like.

2. Description of the Prior Art

A variety of crops are generally planted in a series of parallel rows. Many of these crops, such as sorghum, can be harvested in more than one row at a time. Many multi-row crop gathering devices have therefore been developed over the years. The crop gathering devices called are generally attached to a front end of a combine or the like.

A problem may arise, however, when these devices come into contact with an obstruction such as holes or rocks and the like in a field. Another problem generally exists in that many of these devices use bat-type reels which tend to beat the crop and thus force crops in a rough manner into the header.

Representative examples of prior art crop gathering devices and the like are disclosed in U.S. Pat. No. 3,119,221 to Martin, U.S. Pat. No. 3,771,300 to Jourdan, U.S. Pat. No. 3,919,830 to Gerber, U.S. Pat. No. 4,429,516 to Erickson, U.S. Pat. No. 4,567,717 to Manton, U.S. Pat. No. 4,704,850 to Obermeier, U.S. Pat. No. 4,926,623 to Fiener, U.S. Pat. No. 4,965,991 to Sauder, U.S. Pat. No. 5,040,362 to Morgan et al. and U.S. Pat. No. 5,444,968 to Barton. Some of these prior art devices provide row divider members which are tapered to guide crops toward a header and which pivot at their point of connection to the header for moving over terrain which is variable. These row divider members, however, can become caught by obstructions in the field before they have a chance to pivot upwardly and out of the way. Thus, while many of these prior art devices appear to be satisfactory in use for specific purposes for which they were designed, none seem to be adapted to provide an effective solution for when row divider members come in contact with field obstructions.

Consequently, a need remains for a crop gathering device which provides a comprehensive and yet effective solution to the aforementioned problems in the prior art without introducing any new problems in place thereof.

SUMMARY OF THE INVENTION

The present invention provides a crop gathering apparatus designed to satisfy the aforementioned need. The crop gathering apparatus of the present invention is generally attachable to a front end of a header of a combine or the like. The crop gathering apparatus includes a way for overcoming the problems which arises when the row divider members come in contact with obstructions in a field and become caught before they have a chance to pivot upwardly and out of the way. The apparatus also includes a way for more gently conveying crops into the header.

Accordingly, the present invention is directed to a crop gathering apparatus for a harvesting machine having a transverse header for severing and collecting crop material. The apparatus comprises: (a) rear platform means attachable to and projecting forwardly from a front end of the transverse header of the harvesting machine; (b) guiding means mounted to and projecting forwardly from the rear platform means for guiding crop material toward the rear platform means; and (c) conveying means mounted to the rear platform means for conveying crop material across the rear platform means to the transverse header.

More particularly, the rear platform means extends substantially the length of the transverse header and includes a plurality of lower rear platform members. Each lower rear platform member is generally flat and provides a base for attachment of the conveying means and the guiding means.

The guiding means includes a plurality of row divider members laterally spaced apart from one another and mounted at rear ends to the lower rear platform members so as to define passageways between the row divider members for guiding crop material toward the rear platform means. Each of the row divider members is a forwardly-tapered front crop-engaging structure which includes a rearward section and a forward section. The rearward section of the front crop-engaging structure of each row divider member is hinged about a transverse extending axis to the lower rear platform member to allow pivotal adjustment of the angle of the front crop-engaging structure in relation to the lower rear platform. Adjustability in the angle of the front crop-engaging structure permits the row divider members to be placed in any desired position relative to the transverse header depending upon the height of the crop to be harvested. The forward section of the front crop-engaging structure of each row divider member also is hinged about another transverse extending axis to the rearward section thereof to allow pivotal folding of the forward section between an extended condition, in which the forward section is disposed substantially inline and in the same plane as the rearward section for when the apparatus travels over a field, and a folded condition, in which the forward section is folded up and under the rearward section for when the forward section comes in contact with an obstruction in the field, such as a hole or a rock and the like.

The conveying means includes a transverse upper support member of generally angular cross-sectional shape disposed above the plurality of lower rear platform members, and a plurality of rotatably-driven vertical rotary members laterally-spaced from one another and mounted at lower ends to the lower rear platform members and at upper ends to the transverse upper support member for engaging and conveying crop material rearwardly across the lower rear platform members to the transverse header. Each rotary member is disposed adjacent to one of the passageways defined between the row divider members. Each rotary member includes a central rotary shaft, an outer support member connectably surrounding the central rotary shaft, and a plurality of panels which are circumferentially-spaced about and attached to the outer support member and which generally extend outwardly in tangential relation to the outer support member to engage and force crop material from the rear ends of the passageways defined between the row divider members rearwardly across the rear platform means into the transverse header. Rotation of the panels brings crop material into the transverse header more gently as compared to bat-type reels, for accomplishing this function. The panels also preferably are two (or more) in number on each outer support member and disposed about 180 degrees apart.

The apparatus further comprises retaining means connected to the upper support member for retaining the front crop-engaging structures of the row divider members in a desired position relative to the transverse header. The retaining means is a plurality of support elements having opposite ends. A first opposite end of the support element is attached to the forward section of the front crop-engaging structure of one of the row divider members. A second opposite end of the support element is attached to the transverse upper support member. The support element is the means by which the front crop-engaging structure of each row divider member is retained at a specific angle in relation to the transverse header.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
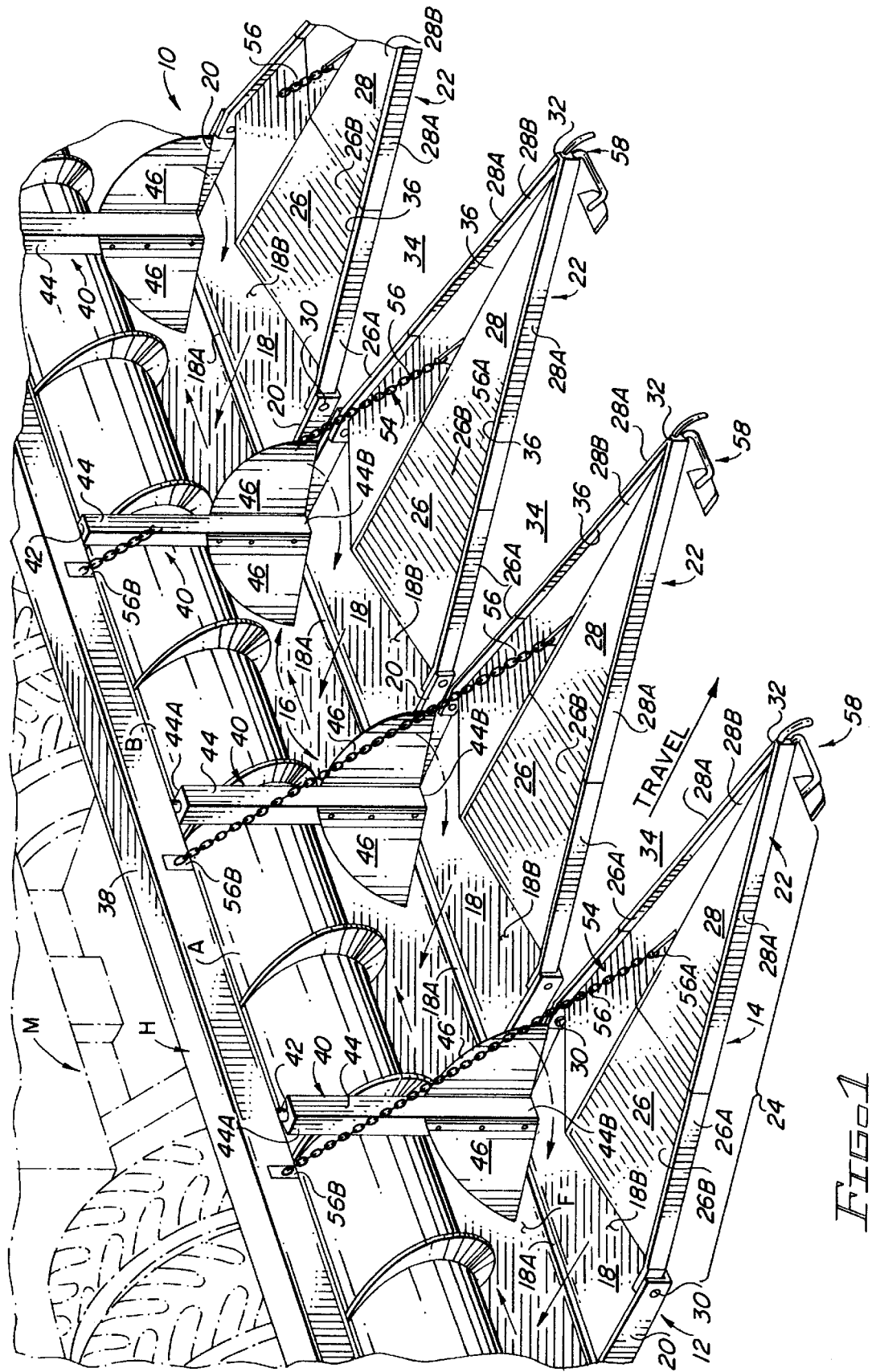
FIG. 1 is a partially broken away front perspective view of a crop gathering apparatus of the present invention attached to a front end of a transverse header of a harvesting machine.
Figure 2:
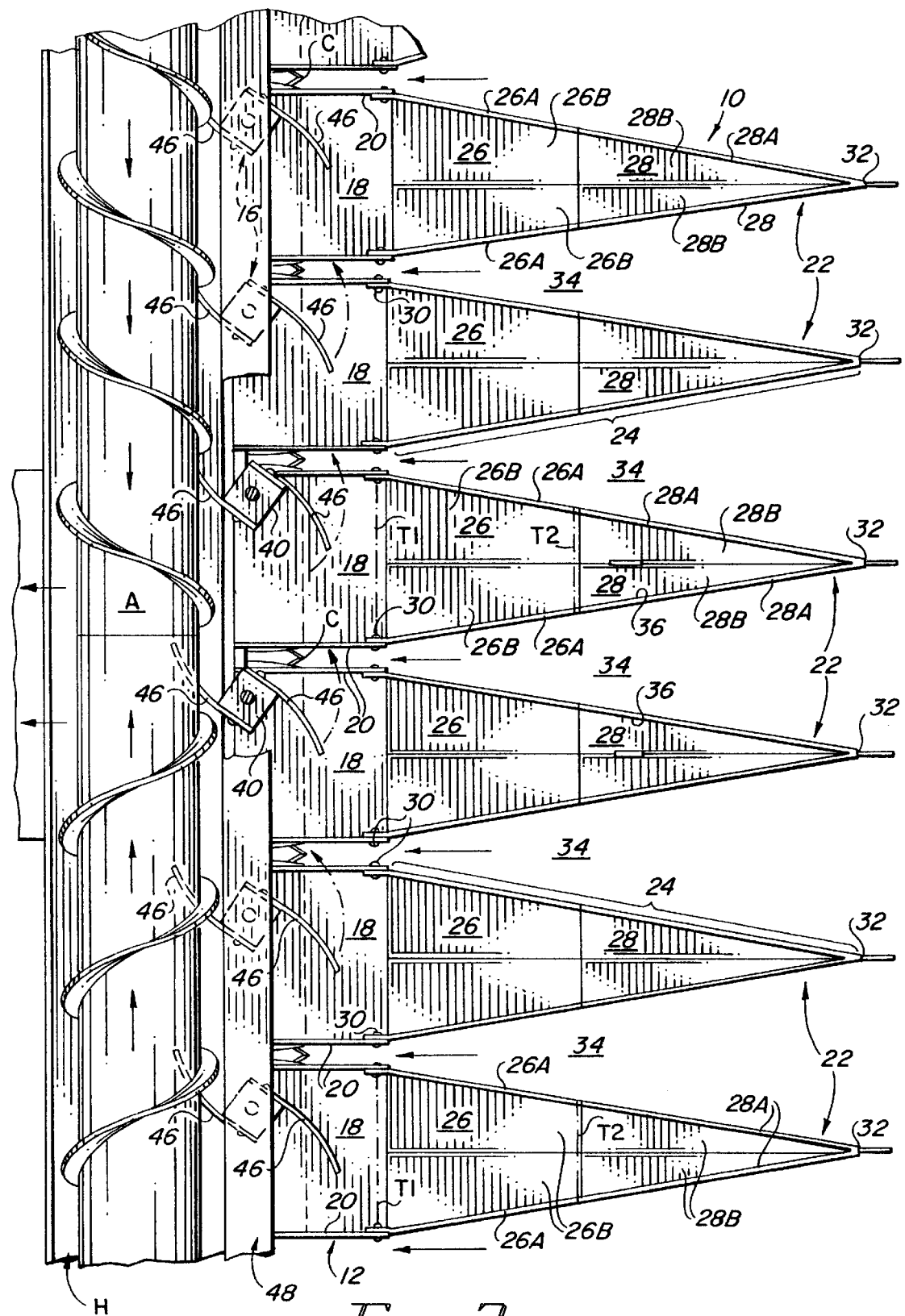
FIG. 2 is a partially broken away top plan view of the crop gathering apparatus.

Referring to the drawings and particularly to FIGS. 1 and 2, there is illustrated a crop gathering apparatus, generally designated 10, of the present invention. The crop gathering apparatus 10 is attachable to a front end of a transverse header H of a harvesting machine M having operating mechanisms, such as a cutterbar C for severing crop material from the field and an auger A for gathering, consolidating and feeding the severed crop material into the harvesting machine M. The crop gathering apparatus 10 basically includes rear platform means 12 attached to and projecting forwardly from the cutterbar C (see FIGS. 4A–4C) along the front end of the transverse header H, guiding means 14 mounted to and projecting forwardly from the rear platform means 12 for guiding crop material rearwardly toward the rear platform means 12, and conveying means 16 mounted to the rear platform means 12 for conveying crop material across the rear platform means 12 to the transverse header H.

Figure 3:
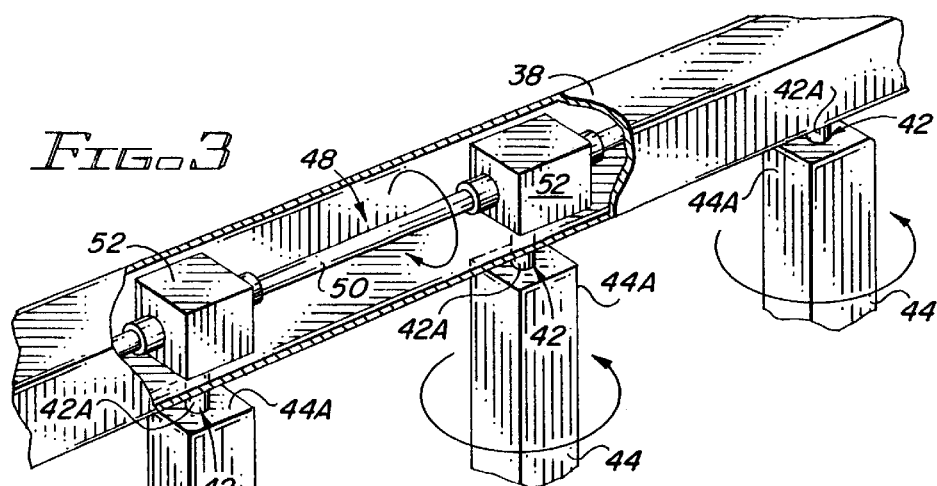
FIG. 3 is a partially broken away enlarged front perspective view of the rotary members and a rotary drive mechanism of the apparatus.
Figure 4C:
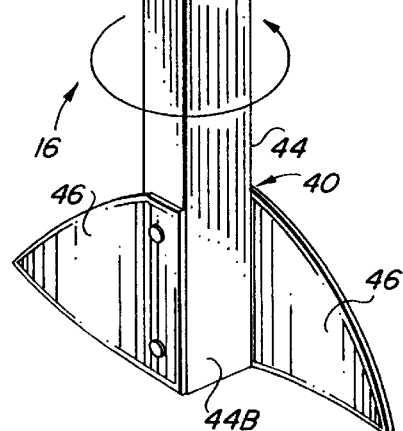
FIG. 4C is a partially sectional and broken away side elevational view of the apparatus on a reduced scale showing the row divider member folded upwardly as the apparatus comes to a stop over the field.
Figure 4C:
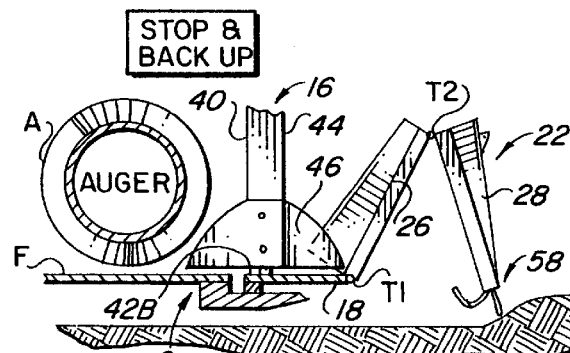
Figure 4A:
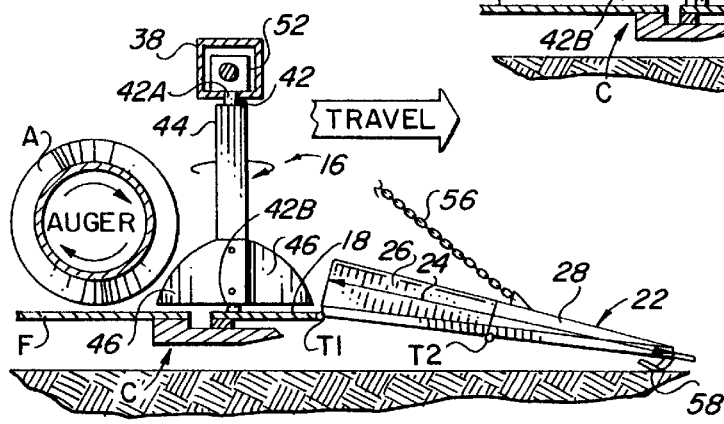
FIG. 4A is a partly sectional side elevational view of the apparatus on a reduced scale showing a row divider member in an extended condition as the apparatus travels over a field.
Figure 4B:
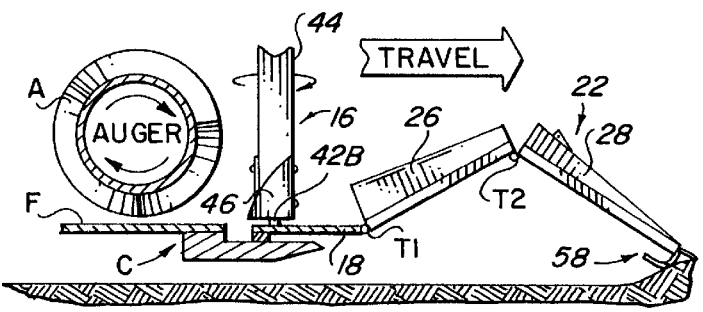
FIG. 4B is a partially sectional and broken away side elevational view of the apparatus on a reduced scale showing the row divider member making contact with an obstruction in the field and folding upwardly as the apparatus continues to travel over the field.

Referring now to FIGS. 1 to 3, the rear platform means 12 extends substantially the length of the transverse header H and includes a plurality of lower rear platform members 18 attached in any suitable manner at their rear ends 18A to the cutterbar C, as seen in FIGS. 4A–4C. Each lower rear platform member 18 is generally flat and has a substantially rectangular configuration but can have any other suitable shape, and is fabricated of a substantially rigid metal material but can be made of any other suitable material. In addition to its rear end 18A, each lower rear platform member 18 has upper and lower surfaces 18B, 18C and a forward end 18D. Each lower rear platform member 18 has a pair of opposite side walls 20 attached along opposite side edges of the member 18 and extending upwardly in substantially perpendicular relationship thereto, providing the rear platform member 18 with a pan-like configuration which is useful in catching crop seeds which shatter while the crops are being harvested. The lower rear platform members 18 are generally disposed in the same horizontal plane as the lower floor F of the transverse header H extending rearwardly from the rear platform members 18. The lower rear platform members 18 provide bases for attachment of the conveying means 16 and the guiding means 14.

Referring now to FIGS. 1 to 4C, the guiding means 14 includes a plurality of row divider members 22 laterally spaced apart from one another and mounted at rear ends to the lower rear platform members 18 for guiding crop material toward the rear platform means 12. Each of the row divider members 22 is in the form of a forwardly-tapered front crop-engaging structure 24 which includes a rearward section 26 and a forward section 28. Each row divider member 22 is generally comprised of a substantially rigid material but can be of any other suitable material.

The rearward section 26 of the front crop-engaging structure 24 of each row divider member 22 is hinged by a pair of hinge pins 30 about a rear transverse extending axis T1 to the respective lower rear platform member 18, particular the forward ends of its side walls 20, to allow pivotal adjustment of the angle of the front crop-engaging structure 24 in relation to the lower rear platform 18. Adjustability in the angle of the front crop-engaging structure 24 permits the row divider members 22 to be placed in any desired position relative to the transverse header H depending upon the height of the crop to be harvested. Further, the rearward section 26 has opposite side walls 26A which extend upwardly and converge toward the forward section 28 of the front crop-engaging structure 24 from the opposite side walls 20 of the lower rear platform members 18. The rearward section 26 also has a pair of angled top faces 26B which diverge downwardly from one another to the opposite side walls 26A thereof. These angled top faces 26B help direct crop heads toward the header H. The rearward section 26 has a substantially trapezoidal configuration which forms a base part of the forward taper of the front crop-engaging structure 24.

The forward section 28 of the front crop-engaging structure 24 of each row divider member 22 also is hinged by another pair of hinge pins about a front transverse extending axis T2 to the rearward section 26 thereof to allow pivotal folding of the forward section 28 between an extended condition as seen in FIG. 4A, in which the forward section 28 is disposed substantially inline and in the same plane as the rearward section 26 for when the apparatus travels over a field, and a folded condition as seen in FIGS. 4B and 4C, in which the forward section 28 is folded up and under the rearward section 26 for when the forward section 28 comes in contact with an obstruction in the field, such as a hole or a rock and the like. The front crop-engaging structure 24 will spring back into place upon the apparatus 10 being raised and/or the harvesting machine H being stopped and backed up. Further, the forward section 28 has a forward end point 32 and opposite side walls 28A extending upwardly and converging at the forward end point 32 thereof. The forward section 28 also has a pair of angled top faces 28B diverging downwardly from one another to the opposite side walls 28A thereof. These angled top faces 28B help direct crop heads toward the header H. The forward section 28 has a substantially triangular configuration which forms an apex part of the forward taper of the front crop-engaging structure 24.

The laterally spaced row divider members 22 define longitudinal extending passageways 34 therebetween through which crop material is gathered and guided rearwardly toward the rear platform means 12. The passageways 34 generally taper rearwardly in the opposite direction of the taper of the front crop engaging structures 24 of the row divider members 22. Forward tapering of the front crop-engaging structure 24 and the rearward tapering of the passageways 34 enables crop material to flow in a smooth fashion rearwardly toward the transverse header H. The row divider members 22 function to straighten leaning crops and pick up downed crop material. Tall or uneven heads of crops are also not lost or cut off but are guided toward the header H and are taken into the harvesting machine M. The peripheries of the row divider members 22 also define troughs 36 for catching the grains and heads of crop material.

The conveying means 16 includes a transverse upper support member 38 of generally angular cross-sectional shape disposed above the plurality of lower rear platform members 18, and a plurality of rotatably-driven vertical rotary members 40 laterally-spaced aparts from one another and mounted at lower ends to the lower rear platform members 18 and at upper ends to the transverse upper support member 38 for engaging and conveying crop material rearwardly across the lower rear platform members 18 to the transverse header H. Each rotary member 40 is disposed adjacent to the rear end of one of the passageways 34 defined between the row divider members 22.

More particularly, each rotary member 40 includes a central rotary shaft 42, an outer support member 44 mounted to and surrounding the central rotary shaft 42 and a plurality of paddle-like panels 46 which are spaced from one another circumferentially about and attached to the outer support member 44 and which generally extend outwardly in tangential relation to the outer support member 44 to engage and force crop material from the rear ends of the passageways 34 defined between the row divider members 22 rearwardly across the rear platform means 12 into the transverse header H. Each central rotary shaft 42 further has opposite upper and lower ends 42A, 42B where the shaft 42 is rotatably mounted to the transverse upper support member 38 and lower rear platform means 12 Each central rotary shaft 42 has a substantially cylindrical configuration but can have any other suitable shape. Each outer support member 44 further has an upper and lower end 44A, 44B. Each outer support member 44 has a substantially rectangular configuration but can have any other suitable shape. Each outer support member 44 extends most but not all of a vertical length of the central rotary shaft 42 and can extend any other desirable length. The panels 46 are preferably attached at the lower ends 44B of the outer support members 44 but can be attached at any other suitable location. The panels 46 have a substantially triangular configuration but can have any other suitable shape and are preferably bowed in the direction of rotation but need not be. Rotation of the panels 46 brings crop material into the transverse header H more gently as compared to bat-type reels, for accomplishing this function. The panels 46 are preferably two in number on each outer support member 44 but may be of any other desirable number. The panels 46 in the preferred embodiment are angularly displaced 180° C. apart but may have any other suitable arrangement. The panels 46 are attached to the outer support members 44 by any suitable means. Each central rotary shaft 42, outer support member 44 and panel 46 is comprised of a substantially rigid material but can be of any other suitable material.

The apparatus 10 further includes a rotary drive mechanism 48 having a transverse drive shaft 50 and a plurality of gear boxes 52. The transverse drive shaft 50 is disposed above the transverse upper support member 38 and preferably enclosed by suitable shielding. The transverse drive shaft 50 is operably connected to a suitable source of rotary power (not shown). The gear boxes 52 are also disposed above the transverse upper support member 38. Each gear box 52 is disposed above one of the rotary members 40 and is operably connected to the transverse drive shaft 50 and to the upper end 42A of the central rotary shaft 42 of the one rotary member 40 disposed therebelow. The rotary drive mechanism 48 may further be of any other suitable arrangement of one or more of the above components and may also include any other suitable component not above mentioned.

The apparatus 10 further includes a retaining means 54 connected to the transverse upper support member 38 for retaining the front crop-engaging structures 24 of the row divider members 22 in a desired position relative to the transverse header H. The retaining means 54 is a plurality of support elements 56, such as flexible chains, having opposite ends 56A, 56B. The support chain is generally comprised of a plurality of metal links or otherwise rigid rings. The first opposite end 56A is attached to the forward section 28 of the front crop-engaging structure 24 of one of the row divider members 22. The second opposite end 56B is attached to the transverse upper support member 38 of the conveying means 16. The support elements 56 are the means by which the front crop-engaging structures 24 of each row divider member 24 is retained at a specific angle in relation to the transverse header H. The retaining means 54 may also be any other suitable means for retaining the front crop-engaging structures 24 of row divider members 22 in a desired position relative to the header H.

The apparatus 10 further includes a plurality of ground engaging members 58 for preventing the row divider members 22 from making direct contact with the ground. The ground engaging members 58 further enable the front crop-engaging structures 24 of the row divider members 22 to skid along the ground and to thereby aid in picking up lodged and/or leaning crops and all the while cutting the upright crops at a foot or more above the ground. Each ground engaging member 58 is preferably attached to the forward section 28 of the front crop-engaging structure 24 of one of the row divider members 22 but can be attached at any other suitable location.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A crop gathering apparatus for a harvesting machine having a transverse header for severing and collecting crop material, said apparatus comprising:

(a) rear platform means attachable to and projecting forwardly from a front end of the transverse header of the harvesting machine;

(b) a plurality of row divider members mounted to and projecting forwardly from said rear platform means and laterally-spaced apart from one another so as to define passageways therebetween for guiding crop material rearwardly toward said rear platform means, each of said row divider members being a forwardly-tapered front crop-engaging structure including a rearward section and a forward section, said rearward section being hinged about a transverse axis to said rear platform means to allow pivotal adjustment of the angle of said front crop-engaging structure in relation to said rear platform means, said forward section being hinged about another transverse axis to said rearward section to allow pivotal folding of said forward section between an extended condition in which said forward section is substantially inline with said rearward section for when said apparatus travels over a field and a folded condition in which said forward section is folded up and under said rearward section for when said forward section comes in contact with a field obstruction;

(c) means for retaining said front crop-engaging structures of said row divider members in a desired position relative to the transverse header; and (d) conveying means mounted to said rear platform means for conveying crop material across said rear platform means to the transverse header that has been guided to and gathered at rear ends of said passages between said row divider members.

2. The apparatus of claim 1 wherein:

said conveying means includes a transverse upper support member; and said retaining means is a plurality of support elements having opposite ends, a first of said opposite ends of each of said support elements being attached to said forward section of said front crop-engaging structure of one of said row divider members and a second of said opposite ends of each of said support elements being attached to said transverse upper support member.

3. The apparatus of claim 1 wherein said rear platform means includes a plurality of lower rear platform members.

4. The apparatus of claim 3 wherein said rear platform means further includes a pair of opposite side walls attached on and rising upwardly above each of said lower rear platform members.

5. The apparatus of claim 1 wherein said rearward section of said front crop-engaging structure of each of said row divider members has a pair of opposite side walls rising upwardly and converging toward said forward section of said front crop-engaging structure of each of said row divider members.

6. The apparatus of claim 5 wherein said rearward section of said front crop-engaging structure of each of said row divider members has a pair of angled top faces diverging downwardly from one another to said opposite side walls thereof.

7. The apparatus of claim 1 wherein said forward section of said front crop-engaging structure of each of said row divider members has a forward end point and opposite side walls rising upwardly and converging at said forward end point thereof.

8. The apparatus of claim 7 wherein said forward section of said front crop-engaging structure of each of said row divider members has a pair of angled top faces diverging downwardly from one another to said opposite side walls thereof.

9. The apparatus of claim 1 wherein peripheries of said front crop-engaging structures of said row divider members define troughs for catching crop material heads.

10. The apparatus of claim 1 further comprising:

a plurality of ground engaging members for preventing said row divider members from making direct contact with the ground, each of said ground engaging members being attached to said forward section of said front crop-engaging structure of one of said row divider members.

11. A crop gathering apparatus for a harvesting machine having a transverse header for severing and collecting crop material, said apparatus comprising:

(a) rear platform means attachable to and projecting forwardly from a front end of the transverse header of the harvesting machine;

(b) a plurality of row divider members mounted to and projecting forwardly from said rear platform means and laterally-spaced apart from one another so as to define passageways therebetween for guiding crop material rearwardly toward said rear platform means, each of said row divider members being a forwardly-tapered front crop-engaging structure including a rearward section and a forward section, said rearward section being hinged about a transverse axis to said rear platform means to allow pivotal adjustment of the angle of said front crop-engaging structure in relation to said rear platform means, said forward section being hinged about another transverse axis to said rearward section to allow pivotal folding of said forward section between an extended condition in which said forward section is substantially inline with said rearward section for when said apparatus travels over a field and a folded condition in which said forward section is folded up and under said rearward section for when said forward section comes in contact with a field obstruction;

(c) means for retaining said front crop-engaging structures of said row divider members in a desired position relative to the transverse header; and (d) conveying means mounted to said rear platform means for receiving crop material guided to said rear platform means and for conveying the crop material to the transverse header, said conveying means including (i) a transverse upper support member disposed above said rear platform means, and (ii) a plurality of rotatably-driven vertical rotary members laterally-spaced from one another and mounted at lower ends to said rear platform means and at upper ends to said upper support member for engaging and conveying crop material rearwardly across said rear platform means to the transverse header.

12. The apparatus of claim 11 wherein said retaining means is a plurality of support elements having opposite ends, a first of said opposite ends of each of said support elements being attached to said forward section of said front crop-engaging structure of one of said row divider members and a second of said opposite ends of each of said support element being attached to said transverse upper support member.

13. The apparatus of claim 11 wherein said rear platform means includes a plurality of lower rear platform members.

14. The apparatus of claim 13 wherein said rear platform means further includes a pair of opposite side walls attached on and rising upwardly above each of said lower rear platform members.

15. The apparatus of claim 11 wherein said rearward section of said front crop-engaging structure of each of said row divider members has a pair of opposite side walls rising upwardly and converging toward said forward section of said front crop-engaging structure of each of said row divider members.

16. The apparatus of claim 15 wherein said rearward section of said front crop-engaging structure of each of said said row divider members has a pair of angled top faces diverging downwardly from one another to said opposite side walls thereof.

17. The apparatus of claim 11 wherein said forward section of said front crop-engaging structure of each of said row divider members has a forward end point and opposite side walls rising upwardly and converging at said forward end point thereof.

18. The apparatus of claim 17 herein said forward section of said front crop-engaging structure of each of said row divider members has a pair of angled top faces diverging downwardly from one another to said opposite side walls thereof.

19. The apparatus of claim 11 further comprising:
a rotary drive mechanism including a transverse drive shaft disposed along said transverse upper support member and being operably connected to a source of rotary power, and a plurality of gear boxes supported by said transverse upper support member, each of gear boxes being disposed above one of said rotary members and operably connected to said transverse drive shaft and to said central rotary shaft of said one rotary member disposed therebelow.

* * * * *